April 5, 1960 F. H. MUELLER ET AL 2,931,380
LUBRICATED ROTARY PLUG VALVE
Filed Feb. 8, 1957 5 Sheets-Sheet 3
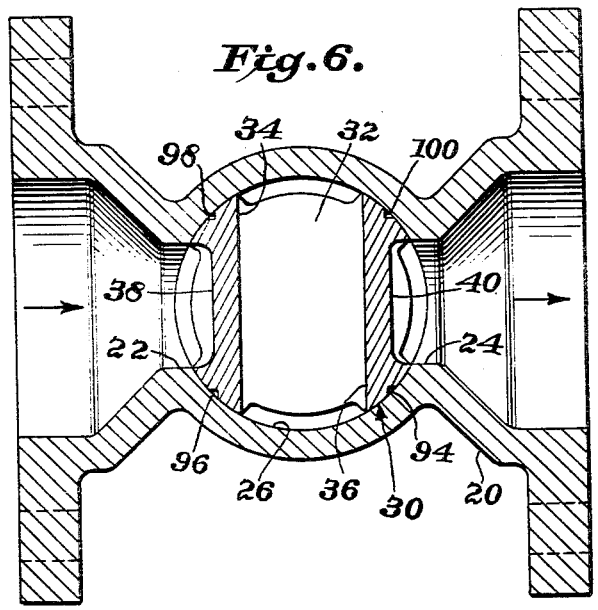
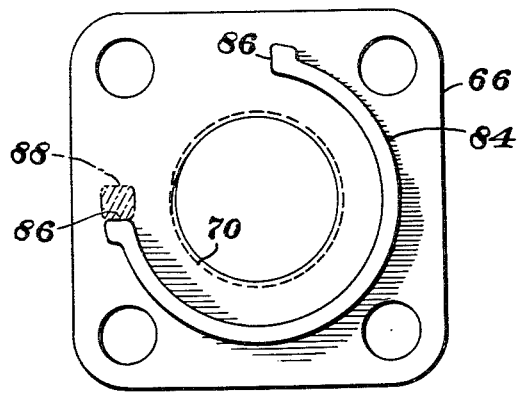
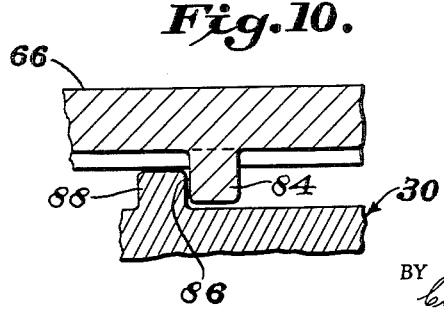
INVENTORS.
Frank H. Mueller,
Roger T. Nation,
John T. Eschbaugh,
BY Cushman, Darby & Cushman
ATTORNEYS.

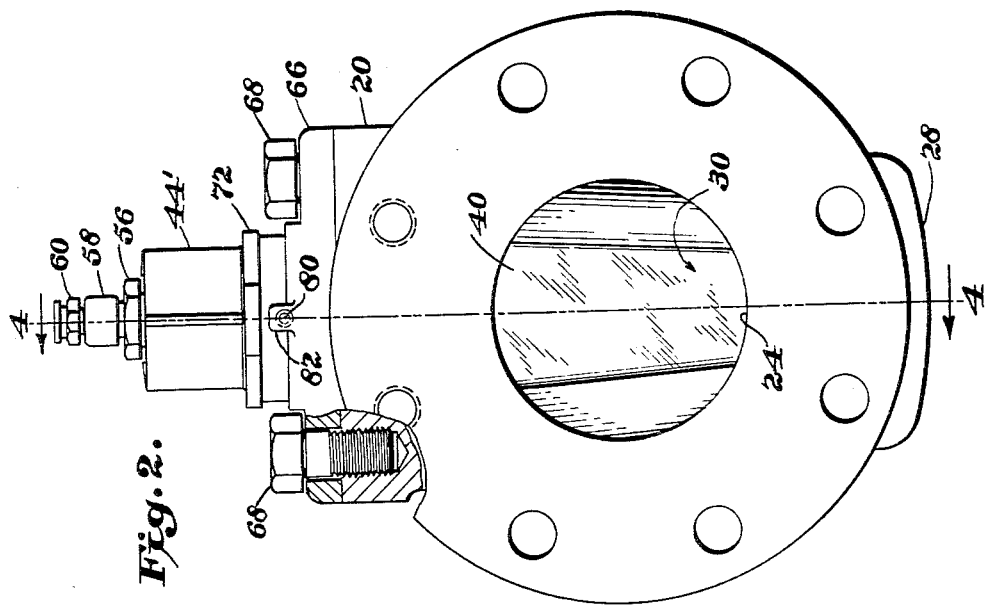
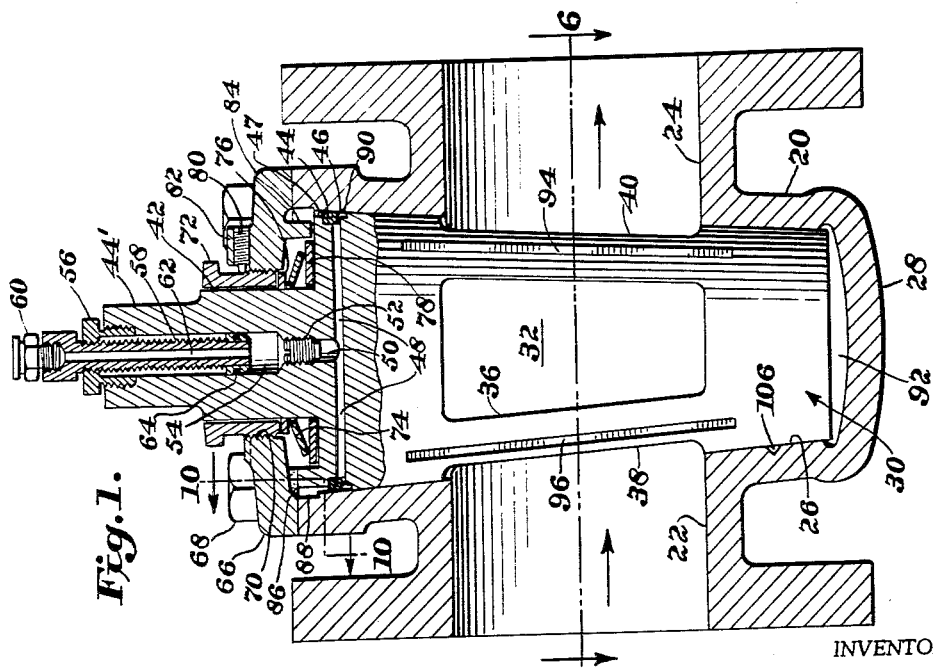

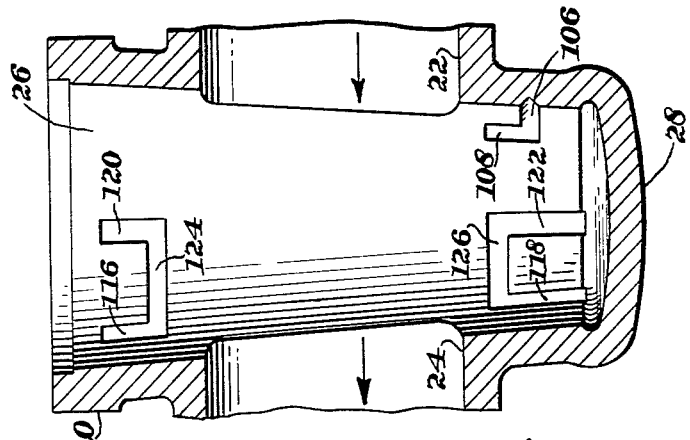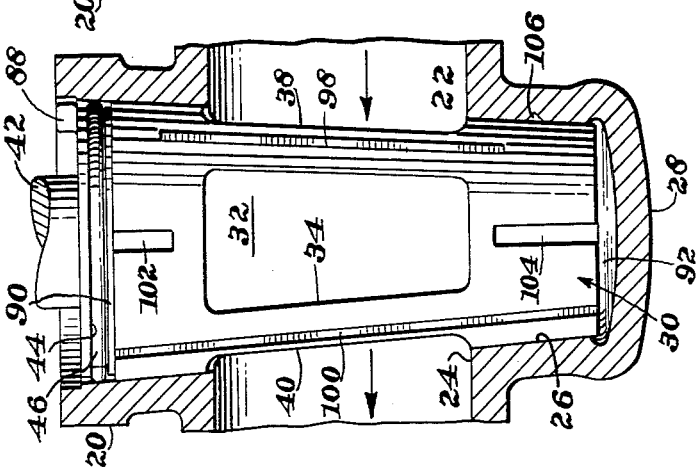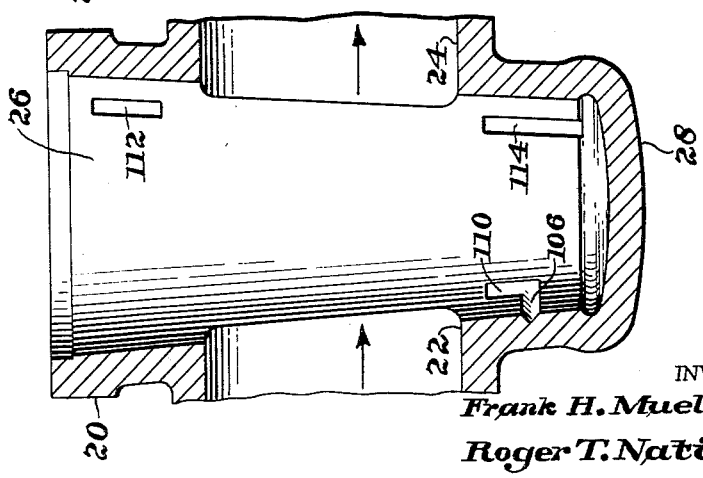

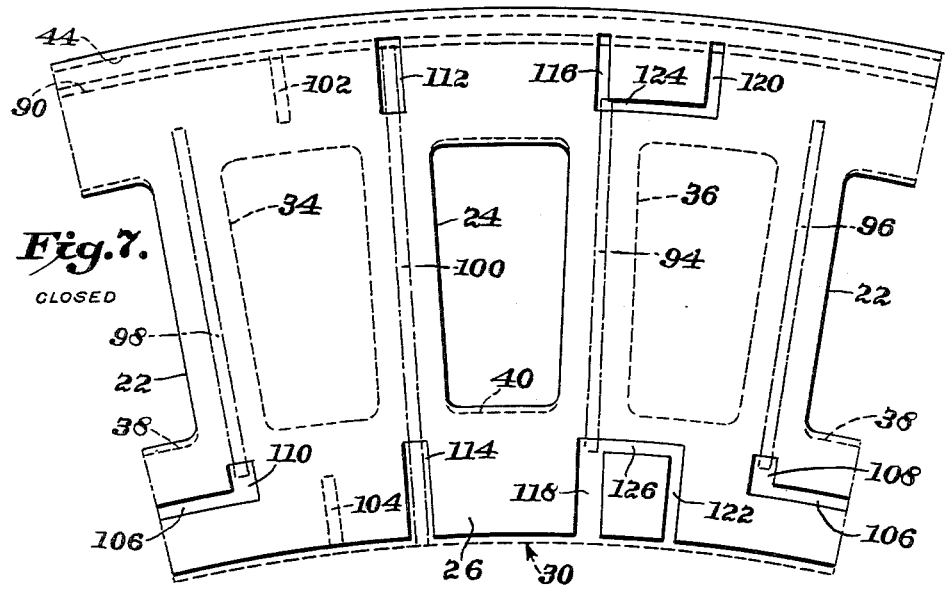
Fig. 7. CLOSED
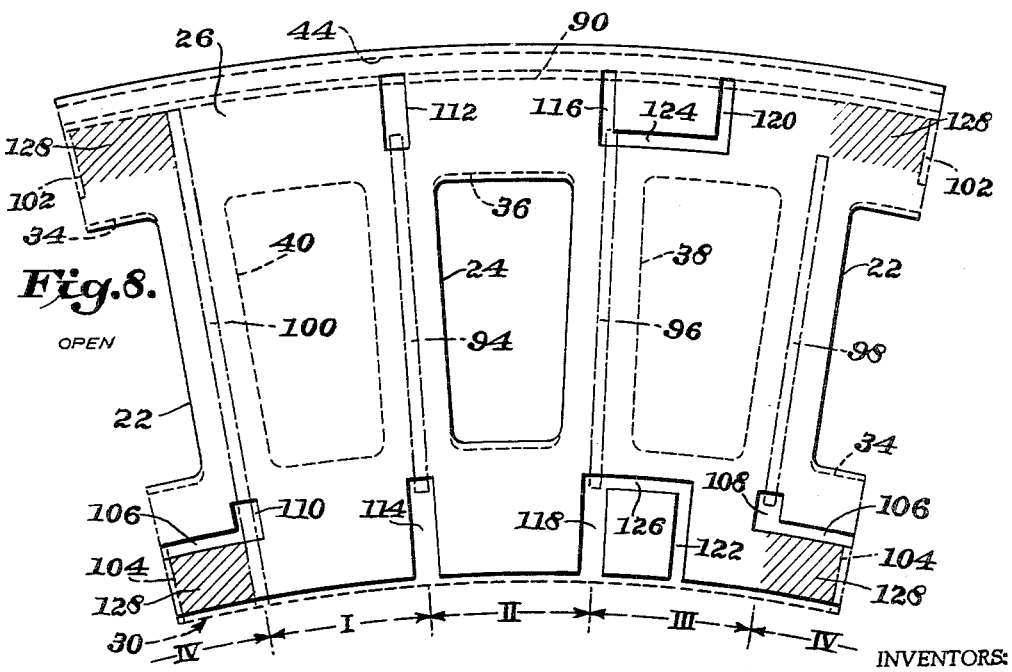
Fig. 8. OPEN
INVENTORS:
Frank H. Mueller,
Roger T. Nation,
John T. Eschbaugh,
BY Cushman, Darby & Cushman
ATTORNEYS.

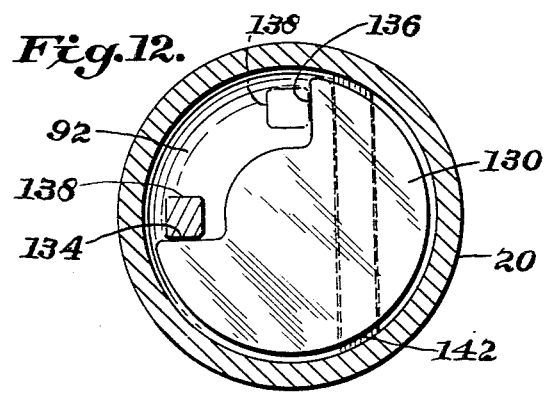
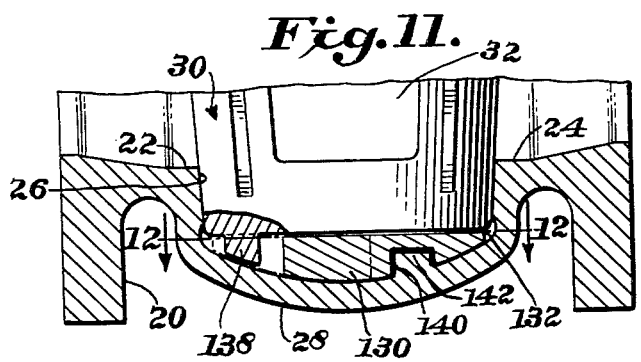
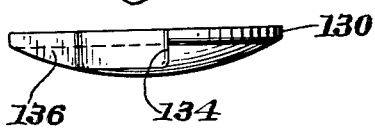
INVENTORS:
Frank H. Mueller,
Roger T. Nation,
John T. Eschbaugh,
BY Cushman, Darby & Cushman
ATTORNEYS.

2,931,380
LUBRICATED ROTARY PLUG VALVE

Frank H. Mueller, Decatur, Roger T. Nation, Mattoon, and John T. Eschbaugh, Decatur, Ill., assignors to Mueller Co., Decatur, Ill., a corporation of Illinois Application February 8, 1957, Serial No. 639,017

12 Claims. (Cl. 137—246.14)

This invention relates to lubricated rotary plug valves. More particularly, this invention pertains to an improved lubricating system for a rotary plug valve.

It is well known in the art to provide a system of lubricant grooves between the opposed sealing surfaces of the plug and seat of a rotary plug valve and to supply such grooves with lubricant so that a thin film of the latter will be smeared over the sealing surfaces during rotary movements of the plug to open and close the valve. In most of these systems, all of the grooves can be supplied with lubricant under pressure in both the open and closed positions of the valve. Furthermore, in most of such systems, in the closed position of the valve lubricant grooves are positioned closely adjacent both the inlet port and the outlet port in the valve seat. Since in the closed position of the valve all of the lubricant grooves are connected together or are in communication with each other, a partial leak through the sealing surfaces about the inlet port may extend to one of the lubricant grooves closely thereadjacent, thence traverse the lubricant system to the grooves closely adjacent the outlet port, and thence pass the relatively short distance between the sealing surfaces to the outlet port.

In so passing through the lubricant system of a valve, it will be seen that such a leak bypasses a considerable distance of the sealing surfaces that are interposed between the inlet and outlet ports. Thus, for example, it is very common in lubricated rotary plug valves to provide lubricant grooves that extend longitudinally between the sealing surfaces at the "quarter" points of the valve, i.e., there are four longitudinally extending lubricant grooves that are uniformly spaced circumferentially about the sealing surfaces and symmetrically disposed with respect to the centerline of the inlet and outlet ports. Thus, when such a valve is closed, the sealing surfaces are separated into four circumferentially-spaced, longitudinal segments, each segment being traversed, substantially midway of its width, by a lubricant groove. Two such segments are located on opposite sides of the seat inlet port between such port and the port in the plug, while the other two segments are located on opposite sides of the seat outlet port between the latter and the plug port.

Therefore, it will be seen that if a leak starts at the seat inlet port and escapes into the lubricant groove in one of the sealing segments adjacent such port, and can then immediately traverse the lubricant system to a groove in one of the segments adjacent the outlet port, such leak will bypass substantially half of the distance between the inlet and outlet ports that is effectively sealed by the interengaged surfaces of the plug and seat.

The aforedescribed possibility of leakage through the lubricant system of a valve is enhanced by the so-called "blow down" effect in a rotary plug valve. When a rotary plug valve is closed, line pressure exerted on the plug in the housing inlet port tends to force such plug toward the seat outlet port and into tighter sealing engagement with the seat about the outlet port, with a consequent slight shifting of the plug away from its engagement with the seat about the inlet port. Although such a shifting movement of the plug, known as "blow down," is microscopic in dimension, it obviously increases the possibility of a leak starting at the inlet port and at least extending to any lubricant groove closely thereadjacent.

It is, therefore, an object of this invention to provide an improved lubricant system for a rotary plug valve wherein the lubricant grooving system adjacent the inlet port of the valve seat is disconnected from the lubricant grooving system of the valve adjacent the outlet port when the valve is in its closed position. By such an improved lubricant system, it will be seen that no portions of the engaged sealing surfaces of the plug and its seat will be bypassed by a leak which extends into the grooving system adjacent the inlet port.

It also is known in existing lubricant systems to provide a system of grooving wherein any grooves which are exposed to a seat port during rotational movements of the plug are disconnected or "cut off" from the remainder of the system during such exposure. Such an arrangement is highly desirable because it avoids undue loss of lubricant, or of the pressure in the system, by extrusion into a seat port.

Accordingly, it is another object of this invention to provide an improved lubricant system which will accomplish the first-mentioned object and at the same time contain a "cut off" feature.

It also is highly desirable in a lubricated rotary plug valve to provide a grooving system which will smear lubricant over the entire area of the sealingly engaged surfaces of the plug and its seat during rotary movements of the plug between open and closed positions of the valve. By so supplying lubricant to the entire interengaged areas of such surfaces, the torque necessary to rotate the plug is considerably reduced and at the same time the lubricant tends to seal microscopic imperfections in such surfaces and to thereby greatly inhibit leakage therebetween.

Accordingly, it is another object of this invention to provide an improved lubricant system which will accomplish not only all of the above-mentioned objects, but also will provide for lubricating the entire area of the interengaged sealing surfaces of the valve plug and its seat.

It has been long known in the art of lubricated rotary plug valves to utilize the pressure of the lubricant to jack the plug off its seat, in the event that the plug should become stuck therein, to thus free the plug sufficiently so that it can be moved relatively easily between its open and closed positions.

Accordingly, it is still another object of this invention to provide a rotary plug valve with an improved lubricant system which will accomplish all of the above-mentioned objects, and also will provide for jacking the plug from its seat on increased lubricant pressure. At the same time, it is another object of this invention to provide a lubricant system wherein increased lubricant pressure, when the valve is in its closed position, will serve to counteract the "blow down" effect to thereby decrease the torque necessary to rotate the plug in its seat. This object is accomplished simultaneously with the first-mentioned object by making provision to disconnect those lubricant grooves adjacent the inlet port of the valve, when the latter is in its closed position, from the remainder of the lubricant system. Consequently, the supply of lubricant under pressure to the remaining grooves of the system, i.e., those adjacent the outlet port, will serve to urge the plug transversely toward the seat inlet port to thereby minimize or completely counteract the "blow down" effect.

Rotary plug valves in substantially every instance are provided with a stem that projects from one end of the plug for rotating the latter. Means must be provided, however, for sealing the stem end of the valve seat against possible leakage therefrom, and also for maintaining the plug in its seat in those instances wherein the valve is of the tapered plug and seat type. In many prior valves of this type, the sealing and seating functions are interrelated, i.e., the sealing and seating functions are not independent of each other. As a consequence, in many instances, as when it is desired to tighten the seal at one end of the valve seat, the plug is forced tighter into its seat with the result that it becomes very difficult, if not impossible, to rotate the plug. It also is extremely desirable to maintain the plug of a tapered rotary plug valve engaged with its seat with an optimum axial force. If this force is unduly increased, the valve casing or housing actually is slightly distorted with the result that a through leak develops, i.e., a leak from the inlet port to the outlet port of the valve. If the seating force on the plug is insufficient, end leaks frequently occur, i.e., leaks at one or both ends of the valve seat.

Accordingly, it is another object of this invention to provide improved means for sealing one end of the seat of a rotary plug valve and also with means, independent of the sealing means, for adjustably maintaining the valve plug seated with an optimum force.

Rotary plug valves of the type under consideration, and particularly the larger sizes, frequently are equipped with stops or checks to limit rotation of the plug to 90° in its movements between open and closed positions of the valve. Frequently, such stops or checks must be relatively accurately machined. In particular, in those constructions wherein one end of the valve seat is closed by an integral portion of the housing and the stop or check is provided within the closed end, it becomes very difficult to machine the required parts.

Accordingly, it is another object of this invention to provide an improved stop for limiting rotation of a rotary plug valve.

Other objects and advantages of the invention will become apparent from the following description and accompanying drawings in which:

Figure 1 is a sectional view of a rotary plug valve embodying this invention and showing the valve in its closed position;

Figure 2 is a righthand view of the valve shown in Figure 1, with parts being broken away to illustrate details;

Figure 3 is a fragmentary view corresponding to Figure 1 but showing only the valve housing;

Figure 4 is a fragmentary sectional view taken substantially on line 4—4 of Figure 2, but with parts being omitted for simplification;

Figure 5 is a view corresponding to Figure 4 but showing only the valve housing;

Figure 6 is a sectional view taken on line 6—6 of Figure 1;

Figure 7 is a development of the valve seat in the housing, with a development of the sealing surface of the plug, and the grooving and port system thereof, superimposed in dotted lines. The relative positions of the plug and seat surfaces are those assumed in the closed position of the valve;

Figure 8 is a view corresponding to Figure 7, but showing the relative positions of the surfaces assumed in the open position of the valve;

Figure 9 is a view of the under or inner side of the bonnet of the valve shown in Figure 1;

Figure 10 is an enlarged, fragmentary, sectional view taken substantially on line 10—10 of Figure 1;

Figure 11 is a fragmentary view corresponding to Figure 1, but illustrating a modified type of stop for the valve;

Figure 12 is a sectional view taken substantially on line 12—12 of Figure 11;

Figure 13 is a side view of one of the parts shown in Figure 11; and

Figure 14 is a view corresponding to Figure 13, but showing the opposite side of the part.

Referring now to Figure 1 of the drawings, a valve housing 20 is provided with inlet and outlet ports 22 and 24 that open in diametrical alignment to opposite sides of a tapered valve seat 26, the small end of which is closed by an integral portion 28 of the housing 20. Rotatably mounted in the valve seat 26, and preferably ground thereto, is a tapered rotary valve plug 30 provided with a transverse passageway 32 (Figure 6) that terminates at its ends in inlet and outlet ports 34 and 36, respectively, adapted to be moved into and out of alignment with the corresponding seat ports 22 and 24 to open and close the valve. The plug 30 also is provided, circumferentially intermediate its ports 34 and 36, with a pair of conventional, diametrically-disposed recesses or false ports 38 and 40 that register with the seat ports 22 and 24, respectively, in the closed position of the valve. At its large end the plug 30 has a cylindrical stem 42 that terminates in a square outer end 44' for engagement by a wrench (not shown) to turn the plug between the open and closed positions of the valve.

Adjacent its larger end and within the seat 26, the plug 30 is provided with a circumferential groove 44, preferably substantially rectangular in radial section, and disposed in such groove is resilient O-ring 46 to provide a combined sealing and lubricant pressure reservoir arrangement like that disclosed in the patent to Mueller, No. 2,653,791. Outwardly of the groove 44, the peripheral surface of the plug 30 preferably is relieved, as at 47, for reasons described in that patent. Lubricant is supplied to the bottom of the groove 44, at the inner side of the O-ring 46, through a plurality of radial passageways 48 in the plug 30 that extend from the inner end of an axial passageway 50 in the valve stem 42. The housing of a conventional check valve 52 is threaded into the inner end of the passageway 50, while outwardly therebeyond the passageway is enlarged to form a lubricant reservoir 54. The outer end of the axial passageway 50 is counterbored and threaded for the reception of an interiorly threaded bushing 56. Threaded into the bushing 56 is a lubricant plunger 58 having an appropriate check-valved grease fitting 60 threaded into the outer end thereof and an axial passageway 62 extending therethrough. The inner end of the plunger 58 is enlarged and provided with a circumferential groove having an O-ring 64 disposed therein which seals with the smooth walls of the reservoir 54.

From the foregoing construction, it will be seen that to charge the valve with lubricant, the lubricant plunger 58 is first unscrewed to its full extent and then by means of an appropriate grease gun (not shown), lubricant can be forced through the plunger and into the lubricant reservoir 54, from which a part of the lubricant will pass through the check valve 52, through the radial passageways 48, and thence into the space in the circumferential groove 44 at the inner side of the O-ring 46. Such lubricant pressure will tend to squeeze the O-ring 46 against the opposed surface of the seat 26 and against the outer side wall of the groove 44 to thus effect a tight seal and also deform the O-ring so that it will store up energy and maintain pressure on the lubricant. As the lubricant pressure decreases on extended use of the valve, pressure on the lubricant can be reinstated by screwing the lubricant plunger 58 inwardly.

A bonnet 66 is secured by screws 68 to the housing 20 at the large end of the valve seat 26 and has a central threaded opening 70 of greater diameter than the valve stem 42. Threaded into such opening 70, and somewhat snugly surrounding the stem 42, is a gland 72 that adjustably bears against one end of a high rate Belleville spring 74, the other end of which bears against the large end of the valve plug 30. Preferably, washers 76 and 78 are interposed respectively between the spring 74 and the gland 72 and between the spring 74 and the end of the valve plug 30. The gland 72 can be locked in any adjusted position by a set screw 80 that extends through an upstanding lug 82 on the bonnet 66. By means of the foregoing construction, it will be seen that the gland 72 can be delicately adjusted to maintain the valve plug 30 in optimum seating engagement with its seat 26. At the same time, however, it will be seen that the plug 30 can be unseated slightly, as later described, because of the resilience of the spring 74. However, because the spring 74 is of high rate design, the unseating movement of the plug 30 is opposed by a rapidly increasing spring force to thereby inhibit the plug from becoming unseated sufficiently to cause leaks.

Depending from the inner side of the bonnet 66 is an arcuate rib 84 (Figure 9) coaxial with the plug 30 and having its ends defining two abutments 86 that are spaced apart slightly more than 90°. Extending between the abutments 86 and alternatively engageable therewith is a lug or stop member 88 on the large end of the plug 30, so that the rotational movements of the latter are limited to 90°, i.e., to that necessary to move the valve between its open and its closed positions.

The edge of the inner side wall of the groove 44 is cut away to provide a relatively shallow, circumferential recess 90 in constant communication with the groove 44 at the inner side of the O-ring 46, while the small end of the plug 30 extends slightly outwardly of the small end of the seat 26, as best shown in Figures 1 and 4. Consequently, it will be seen that the opposed surfaces of the plug 30 and seat 26 are in sealing engagement throughout a major portion of their longitudinal extents, i.e., in a circumferential band or zone which extends from the plug recess 90 to the small end of the valve seat. Likewise, it will be seen that the small end of the plug 30, together with the portion 28 of the housing 20, defines a chamber 92.

Extending longitudinally in the surface of the plug 30 are four uniformly circumferentially-spaced lubricant grooves 94, 96, 98, and 100 that are located at the "quarter" points of the valve. Thus, as will be seen best in Figures 6 to 8, one of these plug grooves is disposed midway between each of the plug ports 34 and 36 and each of the plug false ports 38 and 40. Three of the plug grooves, i.e., 94, 96, and 98, are of equal length and have their ends terminating short of the ends of the sealing surface of the plug 30, while the fourth plug groove 100 extends from the plug recess 90 to the small end of the plug. In the closed position of the valve, as shown in Figures 1, 4, and 6, the groove 100 is disposed adjacent one side of the seat outlet port 24. From an inspection of Figures 1, 9, and 10, it will be seen that the plug 30 is rotated in a counterclockwise direction in order to open the valve from its closed position. It further will be seen that the groove 100 is located in a position where it will not move across, and thereby be exposed to, a seat port 22 or 24 during movements of the plug 30 between its valve open and valve closed positions.

Circumferentially intermediate the grooves 98 and 100, the surface of the plug 30 also is provided with two longitudinally aligned short grooves 102 and 104, one extending inwardly from the recess 90 and the other from the small end of the plug, toward the plug inlet port 34. The inner ends of the grooves 102 and 104 terminate short of the plug inlet port 34, but extend inwardly a distance somewhat greater than the spacings between the corresponding ends of the plug groove 98 and the recess 90 and the small end of the plug 30, respectively.

The valve seat 26 is provided, longitudinally between its small end and the seat ports 22, with a groove 106 that extends circumferentially through substantially a 90° arc and is disposed symmetrically with respect to the seat inlet port 22. The seat groove 106 is spaced somewhat outwardly beyond the ends of the plug grooves 96 and 98, but at its ends is provided with very short longitudinally inwardly extending sections 108 and 110 that are positioned to overlap the corresponding ends of the seat grooves 96 and 98, respectively, when the valve is in its closed position.

Extending inwardly from the opposite ends of the seat sealing surface are two longitudinally aligned short seat grooves 112 and 114 that are located at a quarter point of the valve on one side of the seat outlet port 24 in position to be overlapped completely by the plug groove 100 in the closed position of the valve, as shown in Figure 7. The inner ends of the seat grooves 112 and 114 terminate at longitudinal points where they can be overlapped slightly by the ends of the plug groove 94 in the open position of the valve, as is shown in Figure 8. On the other side of the seat outlet port 24, the seat 26 is likewise provided, at a quarter point of the valve, with two longitudinally aligned short grooves 116 and 118 which extend inwardly from the opposite ends of the sealing surface of the seat distances equal to the corresponding lengths of the seat grooves 112 and 114, respectively. Thus, the inner ends of the seat grooves 116 and 118 will be overlapped by the corresponding ends of the plug groove 94 in the closed position of the valve and of the plug groove 96 in the open position of the valve, as shown in Figures 7 and 8, respectively.

Circumferentially intermediate the seat inlet and outlet ports 22 and 24, the seat 26 is also provided with two longitudinally aligned short grooves 120 and 122 that extend inwardly from the opposite ends of the sealing surface of the seat and are of lengths equal to those of the seat short grooves 116 and 118, respectively. The inner ends of the seat grooves 116 and 120 and the inner ends of the seat grooves 118 and 122 are connected, respectively, by short circumferentially extending seat grooves 124 and 126.

The outer ends of the seat grooves 112, 116, and 120 all extend outwardly to the inner side wall of the plug groove 44 to thus overlap the plug recess 90 and be in constant communication with the groove 44 at the inner side of the O-ring 46. Thus, the recess 90 provides for such communication without the necessity of the seat grooves 112, 116, and 120 being extended outwardly sufficiently to possibly be contacted by the O-ring 46.

When the valve is in its open position, as is shown in Figure 8, all of the seat and plug lubricant grooves communicate directly or indirectly by intercommunication, with the plug groove 44 at the inner side of the O-ring 46 and also with the chamber 92. Consequently, lubricant charging pressure or pressure developed by the grease plunger 58 on the lubricant will charge the entire lubricant system with lubricant under pressure, and such pressure will be maintained by the O-ring 46. If sufficient pressure is exerted upon the lubricant, it will be seen that lubricant pressure in the chamber 92 will act upon the end area of the plug 30 at its small end and jack the plug off its seat 26. Such jacking movement, however, will be opposed by the high rate Belleville spring 74, as previously mentioned.

If the plug is now rotated from its open (Figure 8) to its closed (Figure 7) position, it will be seen that the plug grooves 94 and 98 will move across and be exposed to the seat outlet and inlet ports 24 and 22, respectively. During such exposure, however, the plug grooves 94 and 98 will be disconnected completely from the rest of the grooving system so that the pressure in the grooves 94 and 98 is relieved. Hence, no lubricant will be extruded from the plug grooves 94 and 98 into the seat ports 24 and 22 during movement of the plug 30 between its open and closed positions. In the closed position of the valve, best illustrated in Figure 7, it will be seen that the seat outlet port 24 will be completely surrounded by an uninterrupted "ring" of lubricant under pressure, i.e., by the plug groove 100, the plug circumferential groove 44, the seat grooves 116 and 118 that are interconnected by the plug groove 94, and the chamber 92. This ring of lubricant is under pressure because of the pressure-maintaining effect of the O-ring 46, as previously explained. At the same time, it will be seen thatt the seat inlet port 22 is only partially surrounded by a "ring" of lubricant, i.e., by the plug grooves 96 and 98 that are interconnected at one end by the seat groove 106. These plug and seat grooves 96, 98, and 106 are completely disconnected from the rest of the lubricant grooving system of the valve when the latter is in its closed position, again as best shown in Figure 7. Consequently, it will be seen that even if a leak should occur between the opposed sealing surfaces of the plug 30 and seat 26 adjacent the seat inlet port 22, and such leak should extend to the plug or seat grooves 96, 98, or 106, the leak cannot pass from such grooves directly into the remainder of the lubricant grooving system of the valve. Consequently, any further extension of the leak can occur only by passing an additional distance between the valve sealing surfaces.

In the closed position of the valve, the application of pressure to the lubricant system, i.e., by the charging means or the plunger 58, will result in pressure being applied in all of the plug and seat lubricant grooves, except the grooves 96, 98, and 106. Since these pressurized grooves are located only on that circumferential half of the sealing surfaces located on the downstream side of the valve, the effect will be to urge the plug 30 transversely away from the seat outlet port 24 and toward the seat inlet port 22, thereby minimizing or completely counteracting any "blow down" effect of pressure in the housing inlet port 22. This counteracting effect is extremely advantageous, because after a plug valve has remained in a closed position for an extended period of time, the plug may actually become frozen or stuck in its seat, so as to make the initial torque required to turn the plug extremely high. The application of grease pressure to a valve embodying this invention, when in its closed position, will tend to straighten up the plug in its seat and thereby free the valve for turning movements, or at least considerably reduce the lubricant pressure necessary to jack the plug off its seat which will completely free the plug for turning movements in its seat.

It will be seen that as the valve is moved between its open to its closed positions, the entire area of the sealing surfaces will be smeared with a thin film of lubricant. Thus, for example, in moving from its open to its closed position, the plug groove 100 will lubricate the entire area of a 90° segment I of the sealing surfaces, as shown in Figure 8, the seat grooves 112 and 114 together with the plug groove 94 will lubricate the entire area of another 90° segment II, and the seat grooves 116 and 118 together with the plug groove 96 will lubricate the entire area of still another 90° segment III. The remaining 90° segment IV is lubricated throughout its entire area by the seat grooves 120, 122, and 108 and the plug grooves 98, 102, and 104. In this connection, it will be seen that this 90° segment IV would not be completely lubricated, i.e., within the lightly shaded areas 128 illustrated in Figures 7 and 8, were it not for the presence of the short seat grooves 120 and 122 and the short plug grooves 102 and 104. The seat grooves 124 and 126 serve to maintain system pressure on the lubricant in the plug groove 96 throughout substantially one-half of the arc of movement of the groove 96, and in such one-half nearest the seat outlet port 24 as the plug 30 is turned to open or close the valve. Since pressure is maintained continuously on the lubricant in the plug groove 100, the more critical areas of the sealing surfaces adjacent the seat outlet port 24 are always effectively lubricated.

Referring now to Figures 11 to 14 of the drawings, there is shown a modified type of stop for a rotary plug valve for limiting rotational movements of the plug 30 to 90°, i.e., to only that necessary to move the plug between open and closed positions of the valve. As in the embodiment illustrated in Figure 1, the valve is provided with an integral housing portion 28 which closes the valve seat 26 at the small end thereof and is spaced from the small end of the plug 30 to define a chamber 92. Disposed in the chamber 92 is a disc-like stop member 130 of slightly smaller diameter than that of the chamber 92 to provide an annular space 132 for the reception of lubricant. The opposite sides of the member 130 are substantially complementary to the small end face of the plug 30 and to the inner surface of the housing portion 28. A segment of the periphery of the member 130 is cut away on somewhat greater than a 90° arc to define two circumferentially-spaced abutment surfaces 134 and 136 which are alternatively engageable by a lug 138 on the small end of the plug 30 to limit rotational movements of the latter to 90°. The disc 130 is retained in the chamber 92 against rotation with the plug 30 by a transverse groove 140 in the member 130 into which fits a complementary rib 142 on the inner surface of the housing portion 28.

In the fabrication of the stop illustrated in Figures 11 to 14, the housing rib 142 and the lug 138 on the plug 30 are cast or otherwise formed thereon during manufacture of the housing 20 and the plug. The stop member 130 is separately cast or machined and then may simply be dropped into the housing from the open large end of the seat 26 prior to the insertion of the plug 30. From this construction, it will be seen that the stop member 130 may be cheaply and easily fabricated without the necessity of performing any difficult machining operations at the inner side of the housing portion 28.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A lubricated rotary plug valve comprising: a housing provided with a circular valve seat having diametrically aligned inlet and outlet ports; a valve plug rotatably mounted in said seat and provided with a transverse passageway terminating in inlet and outlet ports that are movable into and out of alignment with the corresponding seat ports to respectively open and close the valve; means defining lubricant grooves extending between the opposed sealing surfaces of said plug and seat adjacent and on opposite sides of said seat outlet port; means defining lubricant grooves extending between said surfaces adjacent and on opposite sides of said seat inlet port, said inlet port grooves being out of communication with said outlet port grooves in the closed position of the valve; and means including an uninterrupted circumferential groove between said surfaces adjacent one end of said seat for supplying lubricant under pressure to all of said grooves in the open position of the valve and to only said outlet port grooves in the closed position of said valve.

2. The structure defined in claim 1 in which the seat and plug are tapered and including a housing portion closing the small end of said seat and defining with said plug a lubricant chamber in communication with all of the grooves in the open position of the valve and with only the outlet port grooves in the closed position of the valve.

3. A lubricated rotary plug valve comprising: a housing provided with a circular valve seat having diametrically aligned inlet and outlet ports; a valve plug rotatably mounted in said seat and provided with a transverse passageway terminating in inlet and outlet ports that are movable into and out of alignment with the corresponding seat ports to respectively open and close the valve; lubricant grooves extending between the opposed sealing surfaces of said plug and seat in spaced relation to said ports in the open and closed position of the valve and defining a closed lubricant system to lubricate said surfaces on rotation of said plug between said valve open and closed positions, said system including an uninterrupted circumferential groove between said surfaces adjacent one end of said seat; and means for supplying lubricant under pressure to said system, a first set of said grooves being closely adjacent said seat outlet port and in communication with said circumferential groove in said valve closed position and a second set of said grooves being closely adjacent said seat inlet port and out of communication with both said first groove set and said circumferential groove in said valve closed position.

4. The structure defined in claim 3 wherein the groove sets include a plurality of grooves extending only in those annular areas of the seat sealing surface located longitudinally beyond the seat ports, and a plurality of separate grooves extending longitudinally in the plug sealing surface and overlapping certain of said seat grooves in both open and closed positions of the valve.

5. The structure defined in claim 3 including stop means to limit rotation of the plug to 90° in moving between the valve open and closed positions, and wherein all of the grooves which are exposed to a seat port during said rotation are disconnected from the system during said exposure.

6. A lubricated rotary plug valve comprising: a housing provided with a circular valve seat having diametrically aligned inlet and outlet ports; a valve plug rotatably mounted in said seat and provided with a transverse passageway terminating in inlet and outlet ports that are movable into and out of alignment with the corresponding seat ports to respectively open and close the valve, the opposed surfaces of said plug and seat being in sealing engagement for a major portion of their longitudinal extents; lubricant grooves extending longitudinally in said plug and seat sealing surfaces in spaced relation to the corresponding ports therein with certain of the grooves in one of said surfaces extending the length of an annular zone thereof which includes the ports therein and all of the grooves in the other of said surfaces extending only in annular zones thereof located longitudinally beyond the ports therein, all of said grooves being in communication with each other in the open position of the valve to define a closed lubricant system which includes an uninterrupted circumferential groove in one of said surfaces adjacent one end of said seat, and those grooves adjacent said seat inlet port in the closed position of the valve being out of communication with said system in said position; and means for supplying lubricant to said system.

7. A lubricated rotary plug valve comprising: a housing provided with a circular valve seat having diametrically aligned inlet and outlet ports; a valve plug rotatably mounted in said seat and provided with a transverse passageway terminating in inlet and outlet ports that are movable into and out of alignment with the corresponding seat ports to respectively open and close the valve; means closing both ends of said seat; lubricant grooves extending in the opposed sealing surfaces of said plug and seat in spaced relation to their corresponding ports to define a closed system for lubricating the entire area of said surfaces on rotation of said plug between open and closed positions of the valve, said system including an uninterrupted circumferential groove in one of said surfaces adjacent one end of said seat, a first part of said system providing a ring of lubricant surrounding said seat outlet port in the closed position of the valve and a second part of said system providing an interrupted ring of lubricant partially surrounding said seat inlet port in said closed position, said system parts being disconnected from each other in said closed position and connected to each other in said open position; and means for supplying lubricant under pressure to said first system part.

8. The structure defined in claim 7 wherein the plug and seat are tapered and the closing means at the seat small end comprises a portion of the housing which together with said seat define a chamber, and wherein the first system part includes said chamber.

9. A lubricated rotary plug valve comprising: a housing provided with a circular valve seat having diametrically aligned inlet and outlet ports; a valve plug rotatably mounted in said seat and provided with a transverse passageway terminating in inlet and outlet ports that are movable into and out of alignment with the corresponding seat ports to respectively open and close the valve; means closing both ends of said seat; stop means for limiting rotation of the plug to 90° in moving between the open and closed positions of the valve; four uniformly-circumferentially-spaced lubricant grooves extending longitudinally in the sealing surface of said plug and disposed symmetrically with respect to the centerline of said plug passageway, three of said grooves terminating short of both ends of said sealing surface and one of said grooves extending the full length thereof and being disposed adjacent said seat outlet port in said valve closed position; a lubricant groove extending circumferentially in the sealing surface of said seat longitudinally beyond said seat inlet port and terminating in enlarged ends that are separately overlapped by two of said three plug grooves in said closed position and by said one plug groove and one of said three plug grooves in said open position; two pairs of aligned lubricant grooves extending longitudinally in said seat sealing surface, one pair adjacent and on one side of said seat outlet port and the other pair adjacent and on the other side thereof, each groove of each pair extending only in an annular zone of said seat longitudinally beyond said seat ports, each pair being overlapped by one of said three plug grooves in said open position, and one pair by one of said three plug grooves and the other pair by said one plug groove in said closed position, all of said grooves being in communication with each other and constituting a closed lubricating system in said open position; and means for supplying lubricant under pressure to said system.

10. The structure defined in claim 9 including two longitudinally aligned lubricant grooves extending inwardly from the opposite ends of the plug sealing surface in alignment with the plug inlet port and terminating short thereof, and two longitudinally aligned lubricant grooves extending inwardly from the opposite ends of the seat sealing surface circumferentially intermediate the seat inlet and outlet ports and circumferentially between said seat inlet port and the said one pair of seat grooves that is overlapped by one of said three plug grooves in the closed position, said two aligned seat grooves being of lengths corresponding to said one pair of seat grooves.

11. The structure defined in claim 10 including two grooves extending circumferentially in the seat, each connecting the inner ends of one of the grooves of said one seat groove pair and one of the said two seat grooves.

12. A rotary plug valve comprising: a housing provided with a circular tapered valve seat having diametrically aligned inlet and outlet ports; a tapered valve plug member rotatably mounted in said seat and provided with a transverse passageway terminating in inlet and outlet ports that are movable into and out of alignment with the corresponding seat ports to respectively open and close the valve, the smaller end of said seat being closed by an integral portion of said housing that is spaced from the corresponding end of said plug member to define a chamber; a stop member loosely disposed in said chamber and receivable therein through the larger end of said seat; one of said members having a pair of opposed abutment surfaces spaced apart arcuately a distance slightly greater than 90°; a lug on the other of said members alternatively engageable with said surfaces to limit rotation of said plug member to 90°; and interfitting means on said stop member and the interior of said housing to restrain relative rotation therebetween.

References Cited in the file of this patent

UNITED STATES PATENTS

| | | |
|---|---|---|
| 1,176,253 | Schutt | Mar. 21, 1916 |
| 1,964,782 | Bard | July 3, 1934 |
| 2,024,945 | Morehead | Dec. 17, 1935 |
| 2,026,891 | Haun | Jan. 7, 1936 |
| 2,093,091 | McCarthy | Sept. 14, 1937 |
| 2,110,098 | Strecker | Mar. 1, 1938 |
| 2,229,120 | Nordstrom | Jan. 21, 1941 |
| 2,233,220 | Nordstrom | Feb. 25, 1941 |
| 2,235,307 | Atkinson | Mar. 18, 1941 |
| 2,281,697 | Kerr | May 5, 1942 |
| 2,285,221 | Mueller | June 2, 1942 |
| 2,322,379 | Morehead | June 22, 1943 |
| 2,533,183 | Schmidt | Dec. 5, 1950 |
| 2,608,374 | Morehead | Aug. 26, 1952 |
| 2,653,791 | Mueller | Sept. 29, 1953 |